(12) United States Patent
Hall et al.

(10) Patent No.: US 11,754,799 B2
(45) Date of Patent: Sep. 12, 2023

(54) PHOTOTHERMALLY ACTUATED SELF-TUNING OPTICAL LIGHT VALVE

(71) Applicant: Government of the United States, as represented by the Secretary of the Air Force, Wright-Patterson AFB, OH (US)

(72) Inventors: Harris J Hall, Yellow Springs, OH (US); David Torres Reyes, Mason, OH (US); Michael E McConney, Dayton, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 413 days.

(21) Appl. No.: 16/933,078

(22) Filed: Jul. 20, 2020

(65) Prior Publication Data
US 2022/0019048 A1 Jan. 20, 2022

(51) Int. Cl.
G02B 26/08 (2006.01)
G02B 7/00 (2021.01)
G02B 6/293 (2006.01)
G02B 7/18 (2021.01)

(52) U.S. Cl.
CPC .......... *G02B 7/008* (2013.01); *G02B 6/29359* (2013.01); *G02B 7/1815* (2013.01)

(58) Field of Classification Search
CPC .. G02B 7/008; G02B 6/29359; G02B 7/1815; G02B 6/29395; G02B 6/4215; G02B 1/002
See application file for complete search history.

(56) References Cited

U.S. PATENT DOCUMENTS

| 9,188,820 B1 | 11/2015 | Evans et al. |
| 2005/0162806 A1* | 7/2005 | Sarkar ...................... H01G 7/00 361/277 |
| 2017/0315386 A1* | 11/2017 | Gong .................. H04J 14/0215 |

OTHER PUBLICATIONS

Starman et al., "Torsional Structures to Enable Large Angle Deflections," Mechanics of Biological Systems & Micro and Nanomechanics, vol. 4 Conference Proceedings of the Society for Experimental Mechanics Series, Springer, Cham (2019). First available Oct. 2018.

* cited by examiner

Primary Examiner — Euncha P Cherry
(74) Attorney, Agent, or Firm — AFMCLO/JAZ; Charles R. Figer, Jr.

(57) ABSTRACT

A tunable optical filter for a detector is presented including a plate having a top side and a bottom side. The plate has material properties making it transparent to a range of optical frequencies. A transparent metasurface is proximate the top side of the plate. The transparent metasurface is configured to have a transmissive pass band and a stop band. An undercarriage support structure is proximate the bottom side of the plate. The undercarriage support is responsive to photothermal heating. The undercarriage support is configured to deform from the photothermal heating caused by an undesired signal thereby shifting the stop band in frequency toward the undesired signal to block reception of the undesired signal by the detector.

21 Claims, 9 Drawing Sheets

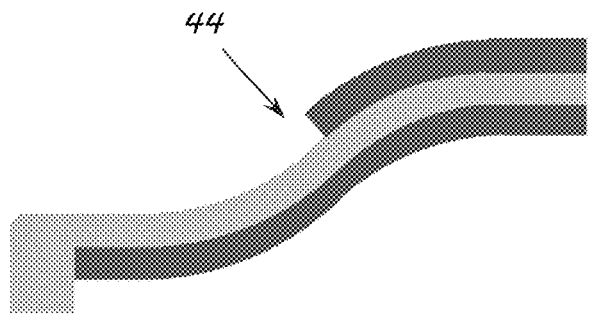
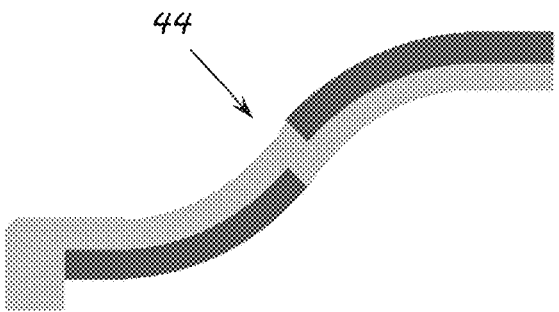
FIG. 9A　　　　　　　FIG. 9B
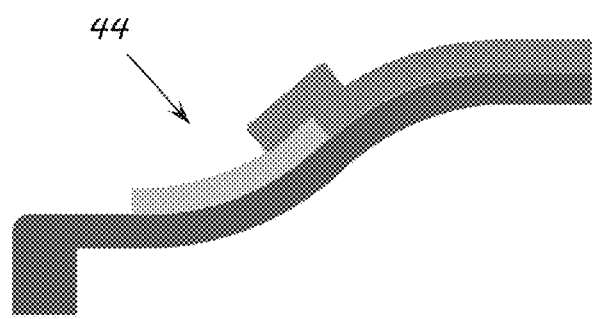
FIG. 9C
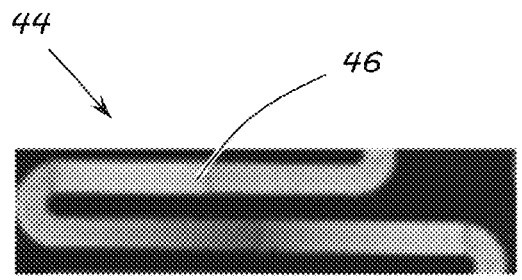
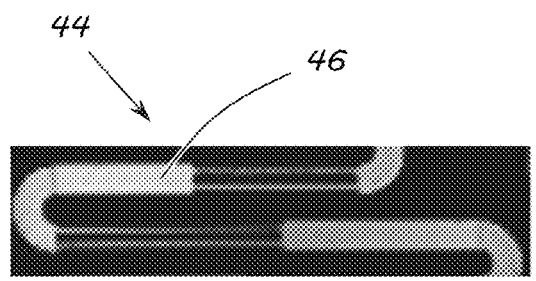
FIG. 9D　　　　　　　FIG. 9E

PHOTOTHERMALLY ACTUATED SELF-TUNING OPTICAL LIGHT VALVE

RIGHTS OF THE GOVERNMENT

The invention described herein may be manufactured and used by or for the Government of the United States for all governmental purposes without the payment of any royalty.

BACKGROUND OF THE INVENTION

Field of the Invention

The present invention relates generally to tunable optical filters and more particularly to photothermally actuated optical filters.

Description of the Related Art

Electrically tunable optical filters have existed for many years as a means of changing the spectral content in a fast dynamically tunable fashion to enable the spectrally selective discrimination for various applications requiring dynamic spectral gain adjustments, such as "smart" hyperspectral imaging or autonomously-tuned MISO optical communication. However, filtering typically requires complex dynamic control methods to enable their dynamic behavior.

There are several contemporary MEMS based tunable optical filters available for fiber optics applications. These filters can provide wavelength selection from a broadband input fiber by using a grating, or other dispersive device, to disperse the light and then use a micromirror to steer specific wavelengths to an output fiber. However, these devices function as spectral filters for known inputs and are often sold integrated with controllers.

Accordingly, there is a need in the art for an optical tunable filter that responds autonomously without external control mechanism to maintain the desired sensed spectral content.

SUMMARY OF THE INVENTION

Embodiments of the invention address the need in the art by providing a self-tunable optical filter for a detector. The optical filter includes a plate having a top side and a bottom side. The plate has material properties making it transparent to a desired range of optical frequencies. A transparent metasurface is proximate to the top side of the plate. The transparent metasurface is configured to have a transmissive pass band and a stop band. An undercarriage support structure is proximate to the bottom side of the plate. The undercarriage support is responsive to photothermal heating and is configured to deform from the photothermal heating caused by an undesired spectral radiation. The stop band is thereby shifted in frequency toward the undesired signal blocking reception of the spectral content from the detector.

In some embodiments, the transparent metasurface may be a Distributed Bragg Reflector (DBR), while in other embodiments, the transparent metasurface may be a High Contrast Grating (HCG). The undercarriage support of some of these and other embodiments may additionally be configured to deform from electrically controlled joule heating.

In some embodiments, the undercarriage support includes a plurality of actuators. A first portion of these actuators may be coated with a tailored absorptive film in a spectral region of interest. A second portion of these actuators may be coated with a thin reflective material. In some of these embodiments, the first portion of the actuators may be positioned opposite the second portion of actuators. In some of these and other embodiments the plurality of actuators may include bimorph films. In some of these and other embodiments, the undercarriage support may include the plurality of actuators configured in a serpentine pattern.

Embodiments of the invention also provide a method of optical filtering. A detector with an optical filter is exposed to an undesired signal. The optical filter includes a transparent metasurface has a transmissive pass band and a stop band. The transparent metasurface is proximate to a plate having material properties making it transparent to a range of optical frequencies in the transmissive pass band. The plate is proximate to an undercarriage support. The undercarriage support deforms from the photothermal heating caused by the absorption of radiation from the environment. The semi-transparent metasurface stop band angularly shifts in frequency in response to the deformation of the undercarriage support thereby changing the spectral content received by the detector to achieve desired performance.

In some of these embodiments, the method further includes deforming the undercarriage support from electrically controlled joule heating. In some of these and other embodiments, the method further includes coating a first plurality of actuators of the undercarriage support with a tailored absorptive film in a spectral region of interest and coating a second plurality of actuators of the undercarriage support with a thin reflective material. The undercarriage support asymmetrically deforms from responses of the first and second plurality of actuators to the photothermal heating.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

FIGS. 9A-9E illustrate exemplary beam configurations for the actuator in FIG. 8;

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Embodiments of the invention address the need in the art by incorporating a self-tuning concept into an optical tunable filter that operates autonomously without requiring any controls associated with spectral or spatial information. While the primary mechanism employed, photothermal actuation, has been demonstrated in the literature, the incorporation of this mechanism asymmetrically into a structure for passively controlled self-actuation has not been utilized in an autonomously controlled tunable filtering application.

Figure 1:
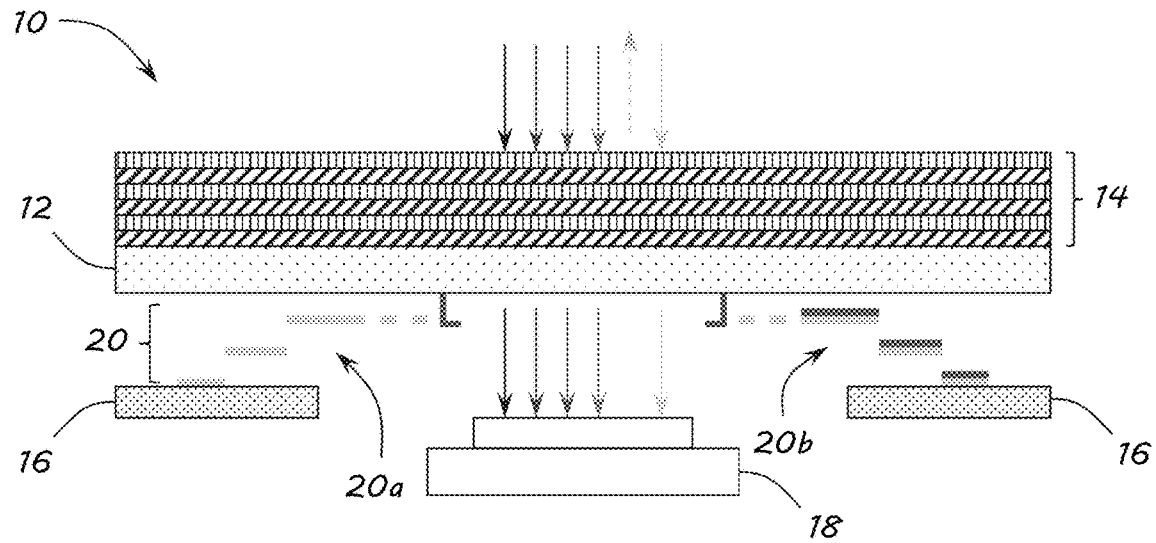
FIG. 1 is a cross-section representation of a tunable optical filter consistent with embodiments of the invention.

Turning now to the drawings and in particular FIG. 1, an exemplary embodiment of the invention 10 includes a plate 12 fabricated from a material that is transparent in a wavelength of interest, such as silicon in this illustrated embodiment, which is designed to operate in the infrared spectral region. The plate may be coated with a Distributed Bragg Reflector (DBR) 14 that defines a transmissive passband, as illustrated in FIG. 1. Other embodiments may utilize other transparent metasurfaces in the same or similar fashion. For example, one of many alternatives to the DBR may include a High Contrast Grating (HCG). The plate 10 may be large enough such that an underlying structure 16 on which it is supported is illuminated by filtered radiation in addition to a detector 18 being protected, which may be positioned directly underneath. An undercarriage support structure 20 may be fabricated of multi-layer patterned bimorph films in some embodiments that are designed to raise the plate 12 out of plane such that the plate 12 has freedom of motion. In some embodiments, only one direction of angular motion (tilt) may be desired requiring two opposing support structures 20a and 20b, with motion in the second direction being mechanically constrained by design. In this particular exemplary embodiment, structure 20a may include a reflective actuator, while structure 20b may include an absorptive actuator, though other embodiments may include other structures and configurations. Still other embodiments may employ similar structures that have full tip, tilt, and piston motions.

Figure 2:
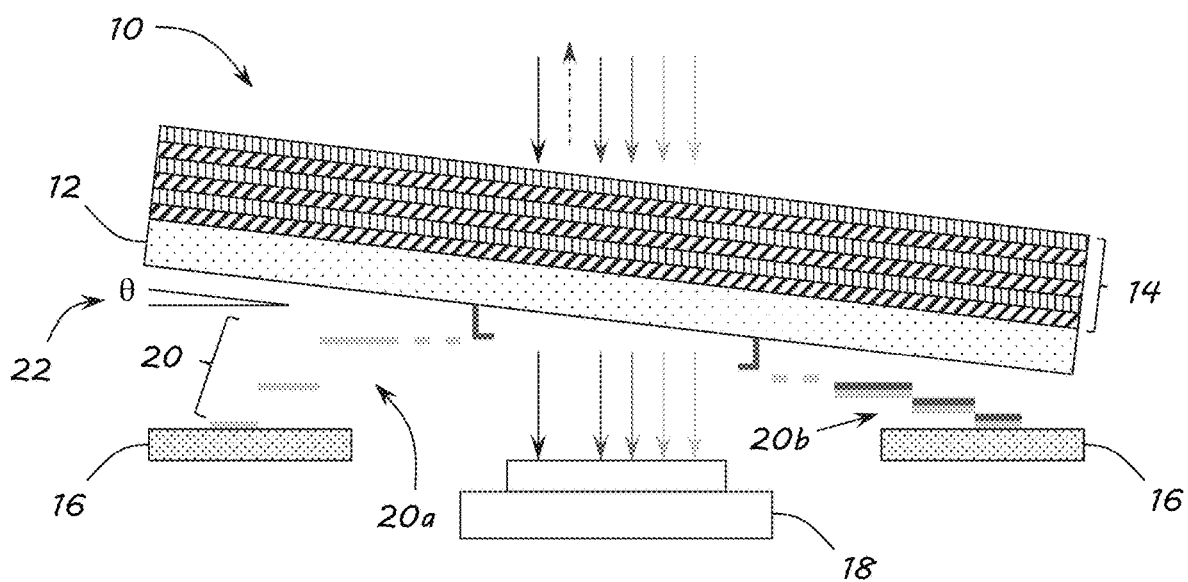
FIG. 2 is a cross-section representation of the tunable optical filter of FIG. 1 in a tilted state.

The multi-layer support structures may be configured to exploit inherent thermal stress in the films to accomplish out-of-plane deformation, large or small, and can leverage electrically controlled joule heating as a secondary mechanism to further relax this stress and actuate motion. Some embodiments may introduce asymmetry in the optical surface properties of two opposite actuators, by selectively coating one with a film that has tailored absorption in the spectral region of interest (structure 20b), such as a single wall carbon nanotube (SWCNT) composite thin film, and maximizing the reflectivity of the other (structure 20a) with additional thin reflective metal coatings. In this exemplary embodiment, structural position of the undercarriage support structure 20 results from asymmetric photothermal deformation of the actuating structures 20a, 20b. By exploiting this asymmetry, the entire structure may be designed such that at a designated level of fluence of filtered radiation (per design of absorber film) the structure will begin collapsing preferentially on one side creating tilt 22, $\theta$, as shown in FIG. 2. This tilt in turn causes the stop band center wavelength of the DBR 14 to shift to shorter wavelength.

Figure 3:
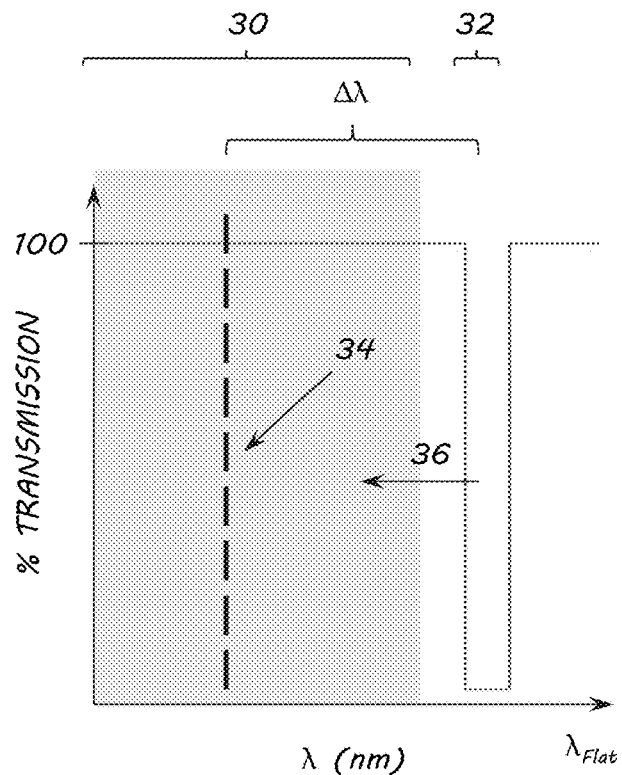
FIG. 3 is a graph of the detector bandwidth, stop band, and undesired signal illustrating the stop band shift.

The significance of this behavior is most easily understood by considering the transmission response as shown in FIG. 3 where the detector operating bandwidth 30 is notionally a region below the stop band 32 when the plate 12 is flat. An undesired signal 34 emerges within the detector bandwidth that the system is designed to filter, which would initiate asymmetric photothermal heating to occur as set out above causing the undercarriage support structure to tilt. As the plate tilts, the stop gap 32 shifts in frequency 36 toward the undesired signal 34. The amount of power required to move the stop band 32 to block the undesired signal 34 depends on the spectral distance ($\Delta\lambda$) from the initial filter position and the photo-thermal absorption efficiency of the film. Additionally, this movement may not be instantaneous and system dynamics should be considered to account for the time required for the filter to move.

Figure 4:
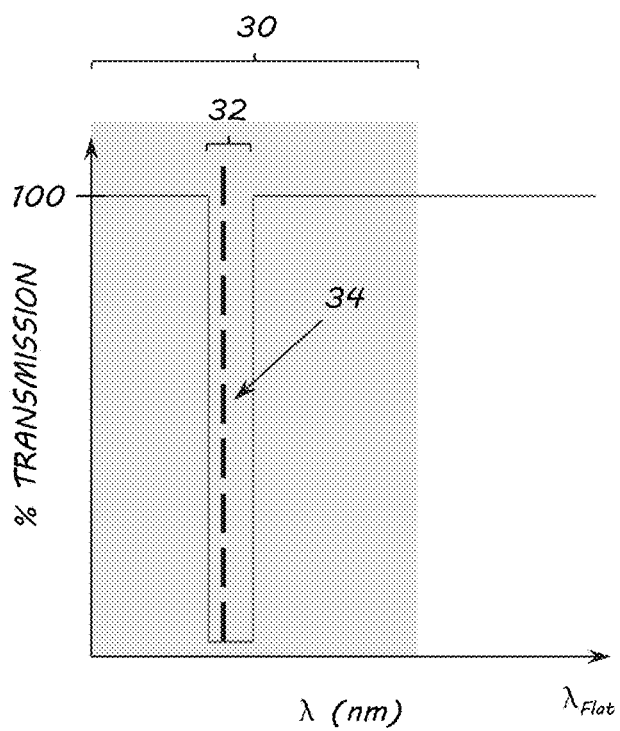
FIG. 4 is a graph of the detector bandwidth, stop band, and undesired signal of FIG. 3 illustrating the stop band shifted to encompass the undesired source.
Figure 5:
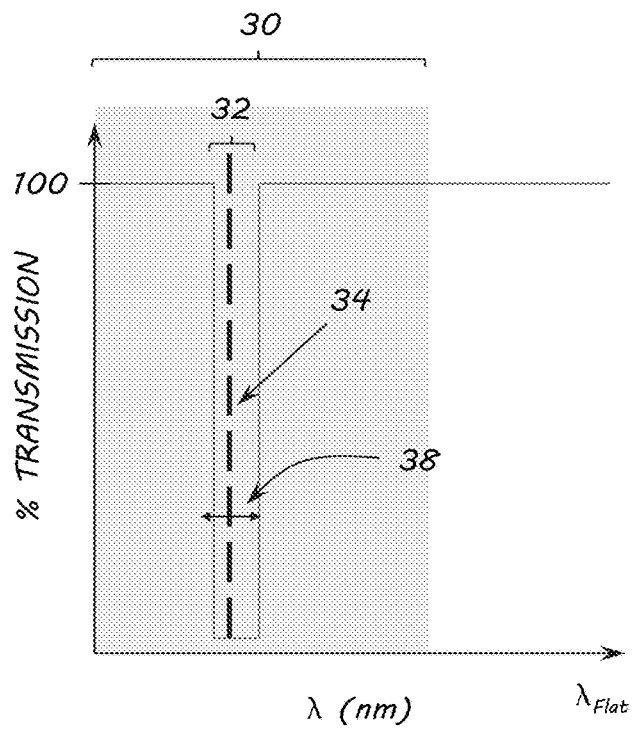
FIG. 5 is a graph of the detector bandwidth, DBR stop band, and undesired signal of FIG. 4 illustrating an oscillating motion of the stop band shifted to encompass the undesired signal.
Figure 6A:
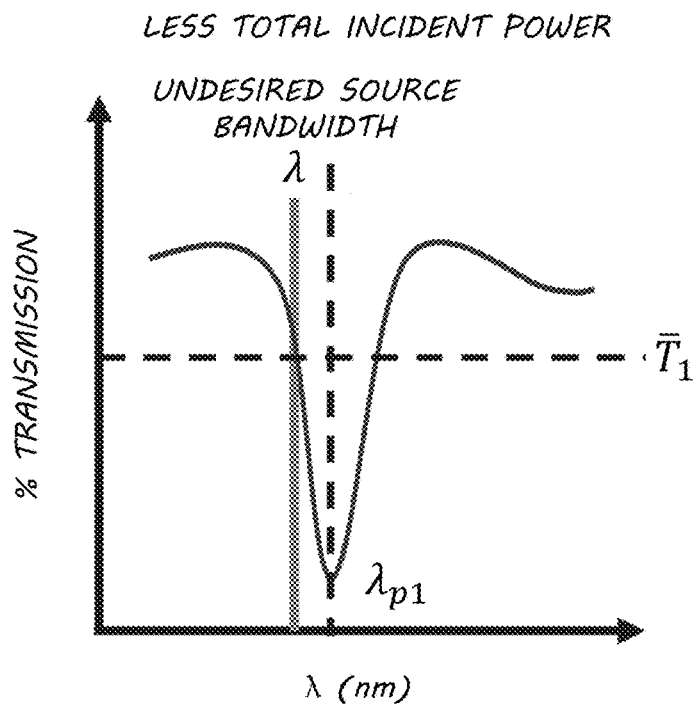
FIGS. 6A and 6B are graphs notionally illustrating a less ideal optical filter and sources with different total incident power levels.
Figure 6B:
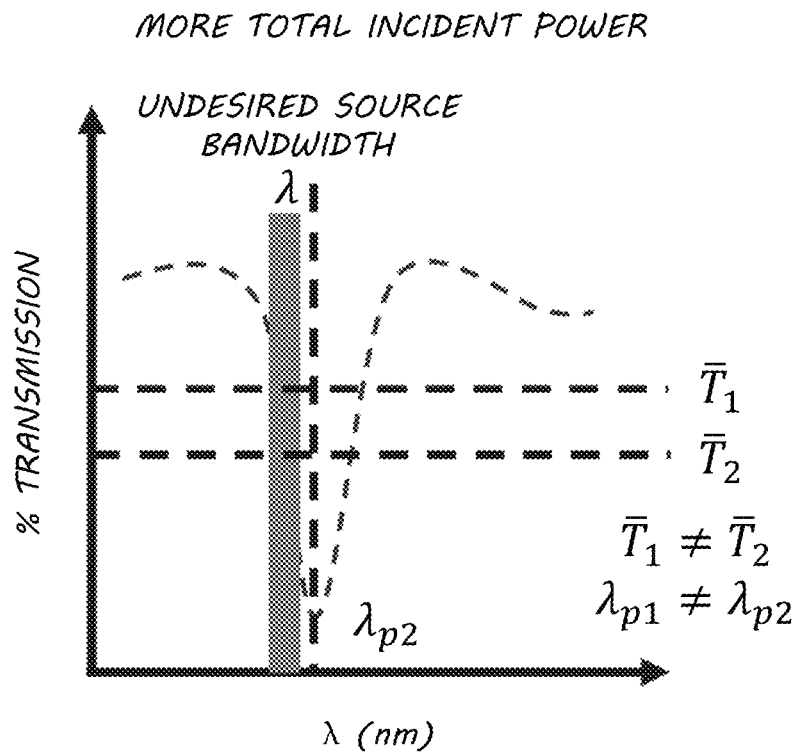

Structures 20a and 20b of undercarriage support structure may be designed to be sensitive enough such that the undercarriage support structure 20 will keep tilting until the stop band 32 overlays that of the undesired signal 34 shown in FIG. 4. At this point, with an ideal reflective notch filter most of the undesired signal is reflected and the structure will stop heating and begin to cool. The cooling will cause the tilt to relax until it is outside the stopband once again at which point it will begin heating again. The heating and cooling behavior will continue in a steady-state type behavior with a small oscillating motion 38 unless (or until) the undesired signal disappears. Thus, the desired steady-state operation of this device under this condition is a small photo-thermal-mechanical oscillation 38 near the tilt position coincident with the edge of the stop band, which effectively protects the detector as illustrated in FIG. 5. One of ordinary skill in the art will recognize, as illustrated in FIGS. 6A and 6B, that real filters are not pure steps and real world spectral features have measurable spectral bandwidth. Actual transmission response will continue to vary as the spectral content and total incident power level vary (irradiance or bandwidth or both).

Multi-physics simulation (coupled thermo-mechanical) was conducted examining actuator design with and without a notional absorptive coating that could be applied to photothermal MEMS devices. These simulations were conducted parametrically at two different incident illumination levels as well as at slightly different DC current biases to examine photothermal impact on the ability to also perform additional manual tuning that may be desired with external feedback. These simulations demonstrated that the exemplary design is well suited to create a strong photothermal response. A 10° tilt dynamic range for some embodiments is likely suitable to accommodate for many different DBR stacks and subsequently the bandwidth of many different detectors and these tilts clearly exceed that at the irradiances shown. However, for this device to function as desired it is important to recognize that it must be designed to actuate for irradiance levels that are appropriate for the specific detector. In addition, the sensitivity, or the change in tilt per unit of irradiance will likely need to be tailored to appropriately accommodate the detector bandwidth and the desired performance specifications. For example, it may be preferable in some cases to have a very stiff structure that only a few degrees of tilt, perhaps for a narrowband detector adjacent to the reflective stop band filter. While for other embodiments it may be more preferable for looser structure (more sensitive structure) that has large angles of tilt, which may assist in addressing wider band detectors.

Figure 7A:
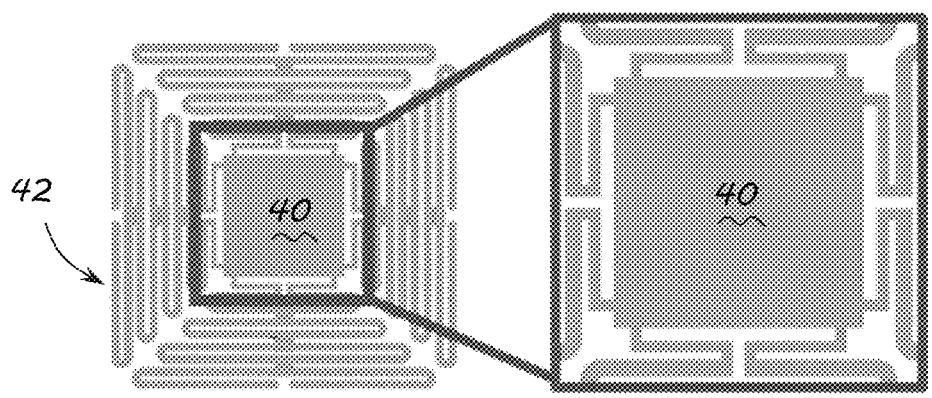
FIGS. 7A and 7B illustrate two connection configurations between the platform and actuators.
Figure 7B:
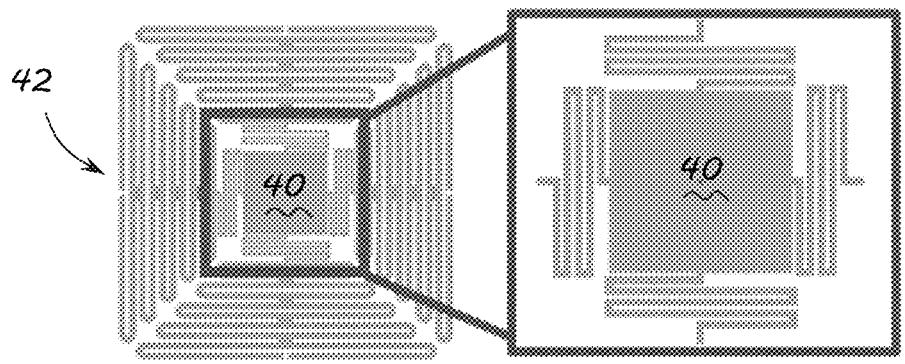
Figure 8:
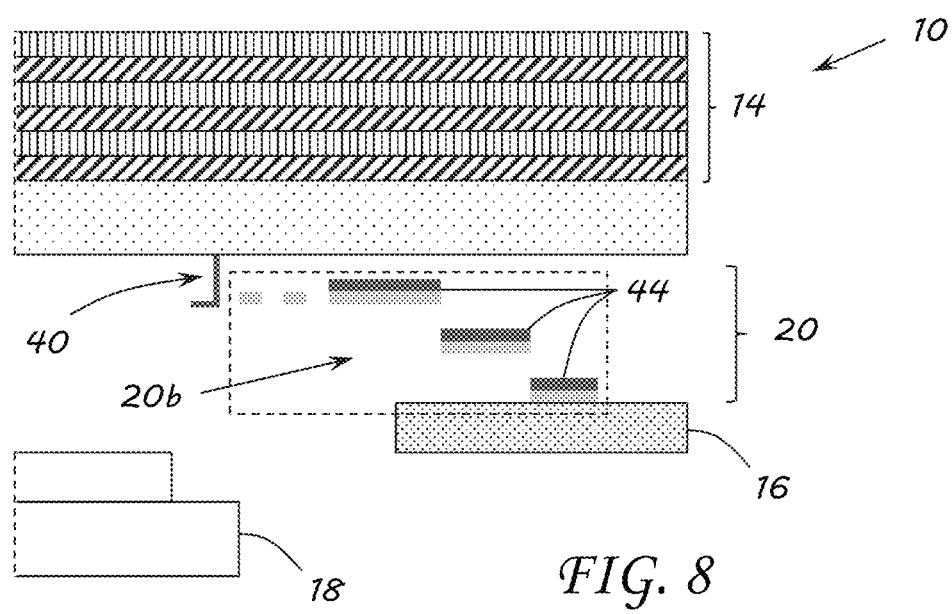
FIG. 8 is a partial view of the cross-section representation of a tunable optical filter of FIG. 1.

There are also many potential design variations for the undercarriage geometry. These parameters can be broken down into different portions of the undercarriage such as connections between the actuator and platform, configurations of the actuator beam components, actuator corner geometry, and number of pairs of beams. For example, FIGS. 7A and 7B illustrate design options for the connections between the platform 40 and actuator 42. FIG. 7A illustrates a fixed, or stiffer connection, while FIG. 7B illustrates a spring, or looser connections. Other combinations of the fixed and spring configurations may also be used or combined to achieve the required stiffness. Likewise, the beam structures 20b in FIG. 8, may have varied configurations as illustrated in FIGS. 9A-9E. For example, the beams 44 may have a stacked material configuration as illustrated in FIG. 9A, or may have a dual bimorph configuration as illustrated in FIG. 9B. In still other configurations, the beams may be in a post processed configuration, where additional components are added to foundry produced structures as illustrated in FIG. 9C. Likewise, the metals layers 46 on the beams may be continuous as illustrated in FIG. 9D, or may be split as illustrated in FIG. 9E. Other configurations may also include hypercycloid design variations.

Figure 10A:
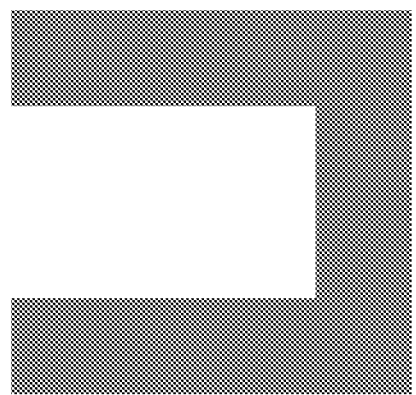
FIGS. 10A and 10B illustrate exemplary beam corner configurations for the actuator in FIG. 8.
Figure 10B:
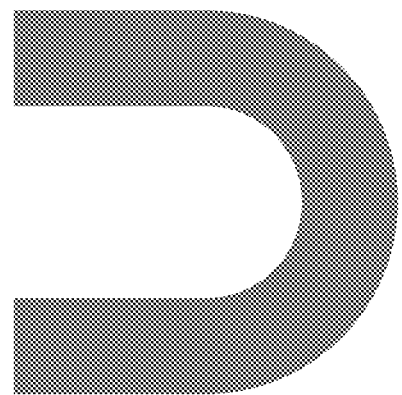
Figure 11A:
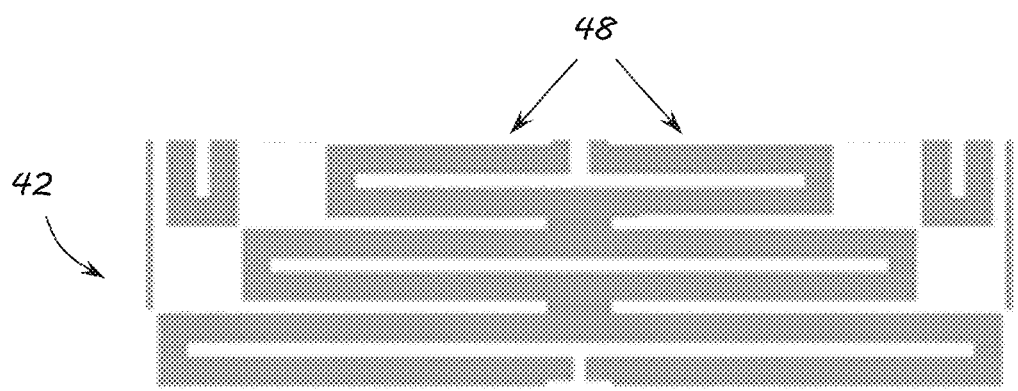
FIGS. 11A-11C illustrate exemplary actuator configurations varying the number of beams used to make up the actuator in FIG. 8.
Figure 11B:
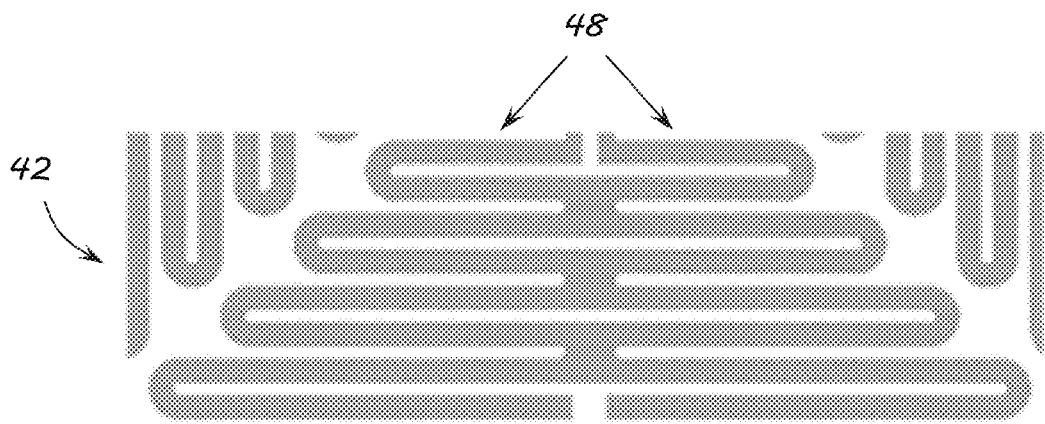
Figure 11C:
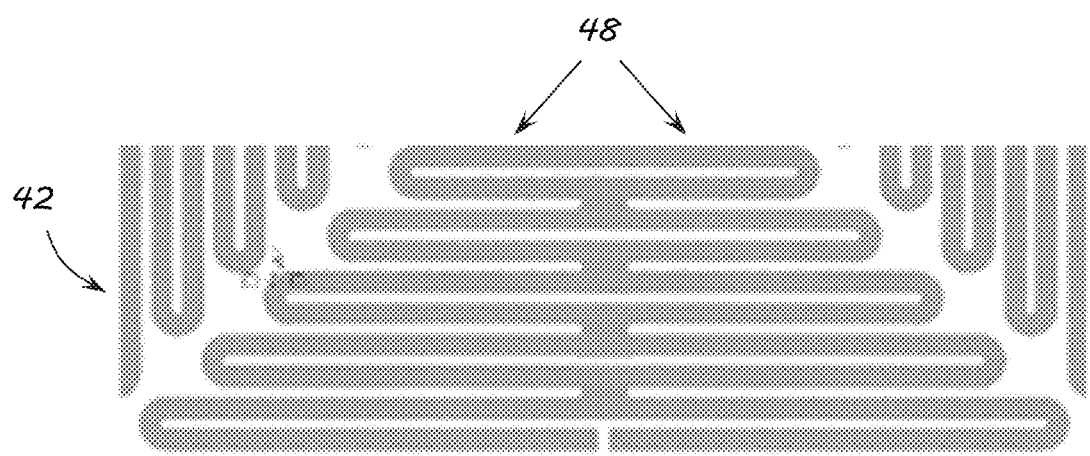
Figure 12A:
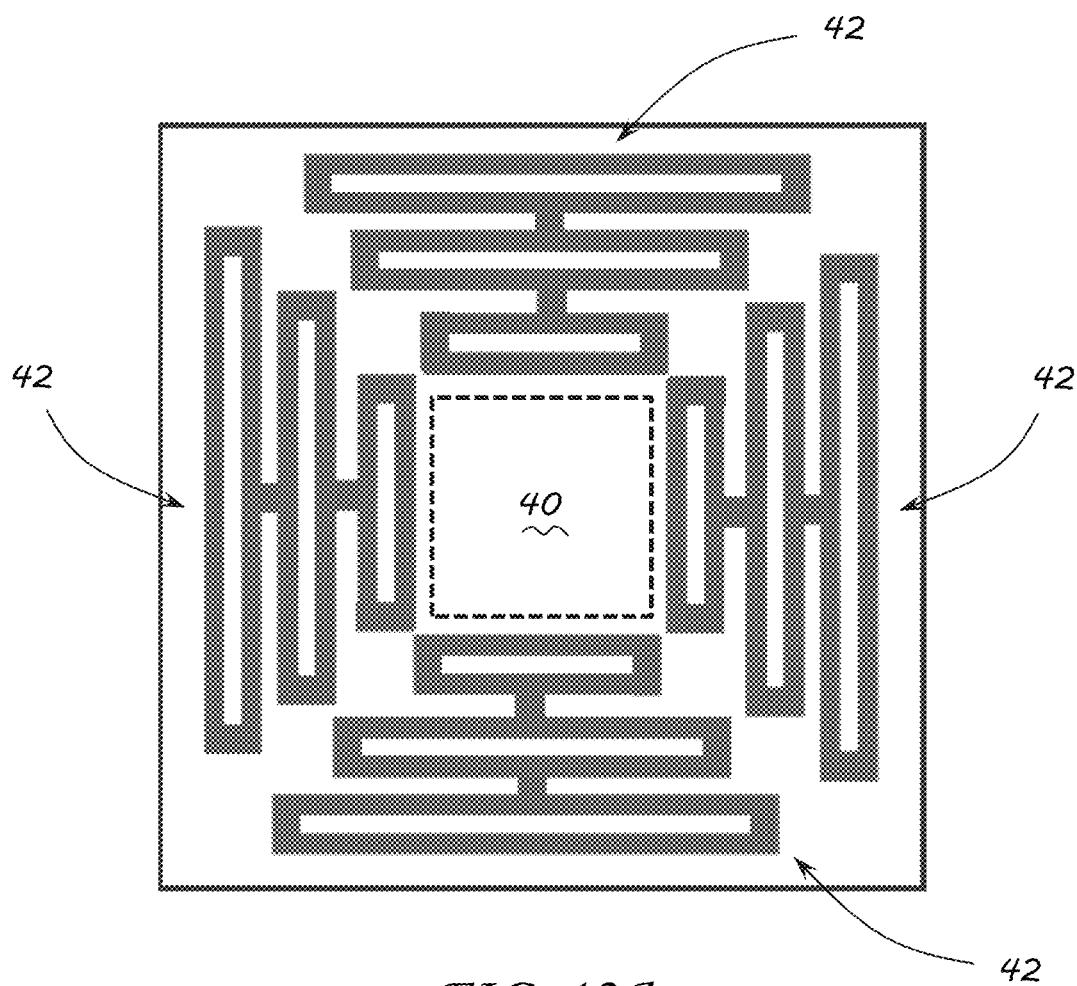
FIGS. 12A-12C illustrate exemplary actuator placement with respect to the platform that may be used with the tunable optical filter of FIG. 8.
Figure 12B:
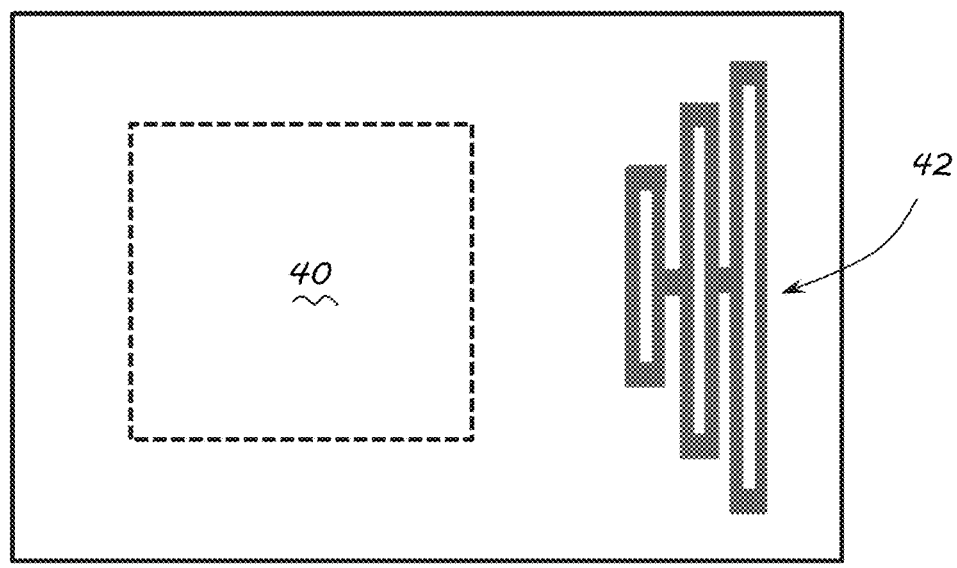
Figure 12C:
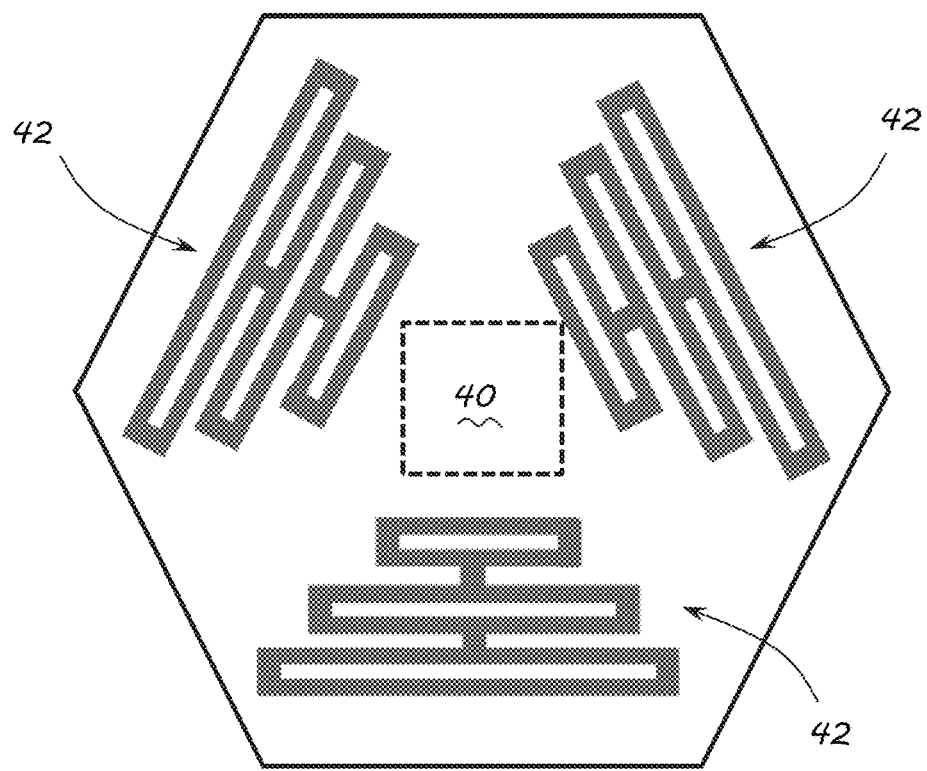

In addition to the multiple configurations for the individual beam 44 elements, the actuators 42 themselves may also have several design configurations. In some configurations the corners of the beam structures making up the actuators 42 may be square corners as illustrated in FIG. 10A, or alternatively be rounded corners as illustrated in FIG. 10B. Additionally, the number of beam pairs 48 may be varied with different possible configurations illustrated in FIGS. 11A-11C depending on the required range of motion and displacements. Placement and number of actuators 42 may also be considered based on the tip/tilt requirements. FIG. 12A illustrates a configuration containing four actuators 42 in a symmetric pattern providing the platform with the ability to have tip, tilt, and piston motions. FIG. 12B illustrates a rectangular single-arm configuration providing a one-dimensional tilt motion. Alternatively, and similar to FIG. 12A, FIG. 12C illustrates a three-arm symmetrical configuration also providing tip, tilt, and piston motions. A structure constrained to 1-D motion, such as the configuration in FIG. 12B, will have less degrees of freedom and may offer a more stable response that will be preferable for many detectors; however, other geometries such including those illustrated in FIGS. 12A and 12C, may offer a wider range of different filtering capabilities for, for example, a multi-spectral response.

In the illustrated exemplary embodiment set out above, the light is initially incident normal to the plate 42 (perpendicular angle of incidence). The installation angle of the device may be deliberately tilted relative to the detector in other embodiments to enable 1-D scanning from either a high to low wavelength or low to high wavelength and perhaps better accommodate the reflective beam path within the overall subsystem design. This deliberate tailoring of the mounting angle may assist in expanding the design flexibility for different systems. Additionally, the initial static position of the plate 42 may be biased off-normal in some embodiments as a means of accommodating subsystem constraints or if calibration of the stop band is required to compensate for misalignments in overall fabrication.

As set forth above, the reflective stop band 32 will not be ideally rectangular in shape as shown in FIG. 3, but may more along the lines of that illustrated in FIGS. 6A and 6B. When considering design of the tunable optical filter, the transmission region will not be 100%. There will be both Rayleigh scattering at the initial interface with the air (or vacuum) and potential absorption. Second, the Distribute Bragg Reflector (DBR) coating may have a rather rounded primary lobe with several sidelobe passbands. Moreover, responsivity (or sensitivity) with incident irradiance at different wavelengths of interest and the dynamic range (i.e. full tilt/wavelength range inherent to DBR structure) are two performance metrics that may be considered in the coupled device design to define requirements. Additionally, system dynamic response, which would be measured as either photo-thermo-mechanical frequency response (i.e. Bode plots) or time domain response (i.e. impulse and step input response plots) with on and off tuning times, may need to be considered as well depending upon the characteristics of the optical filter. For example, the incident thermal heat response may also cause additional ringing due to excitation of a mechanical vibrational mode of the structure, which can inhibit settling to the desired steady-state response.

In addition to the exemplary configurations illustrated above, which depict dedicated broadband absorber and reflective layers, variations for additional embodiments are possible in terms of spectrum, omnidirectionality, and the sophistication of these layers. For example, an absorber coating may be an absorbing metasurface, consisting of a multiple layer stack with a specifically designed spectral response. Furthermore, the spectral properties of the reflector may also be tailored in a many unique ways, for example instead of a narrower band-gap filter, a long-pass or short-pass filter could be used. One particular illustrative example may include a design that utilizes a multilayer actuator stack itself to possess a natural Fabry-Perot resonance that amplifies absorption coincident with the desired spectral absorption range. Preference for directionality may also be considered with normally incident light being more or less absorptive than off-axis, for example. Likewise, a reflective coating may be similarly tailored.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A tunable optical filter for a detector, the optical filter comprising:
   a plate having a top side and a bottom side, the plate having material properties making it transparent to a range of optical frequencies;
   a transparent metasurface proximate the top side of the plate, the transparent metasurface configured to have a transmissive pass band and a stop band; and
   an undercarriage support structure proximate the bottom side of the plate, the undercarriage support responsive to photothermal heating;
   the undercarriage support structure configured to deform from the photothermal heating caused by an undesired signal thereby shifting the stop band in frequency toward the undesired signal to block reception of the undesired signal by the detector.

2. The tunable optical filter of claim 1, wherein the transparent metasurface is a Distributed Bragg Reflector (DBR).

3. The tunable optical filter of claim 1, wherein the transparent metasurface comprises a multilayer actuator stack exhibiting Fabry-Perot resonance.

4. The tunable optical filter of claim 1, wherein the transparent metasurface is a High Contrast Grating (HCG).

5. The tunable optical filter of claim 1 further comprising:
   the undercarriage support additionally configured to deform from electrically controlled joule heating.

6. The tunable optical filter of claim 1, wherein the undercarriage support comprises:
   a plurality of actuators;
   a first portion of the plurality of actuators coated with a tailored absorptive film in a spectral region of interest; and
   a second portion of the plurality of actuators coated with a thin reflective material.

7. The tunable optical filter of claim 6, wherein the first portion of the plurality of actuators is positioned opposite the second portion of the plurality of actuators.

8. The tunable optical filter of claim 6, wherein the plurality of actuators comprise bimorph films.

9. The tunable optical filter of claim 1, wherein the undercarriage support comprises a plurality of actuators configured in a serpentine pattern.

10. A system, comprising:
    a detector; and
    an optical filter, including:
      a plate having a top side and a bottom side, the plate having material properties making it transparent to a range of optical frequencies;
      a transparent metasurface proximate the top side of the plate, the transparent metasurface configured to have a transmissive pass band and a stop band; and
      an undercarriage support structure proximate the bottom side of the plate, the undercarriage support responsive to photothermal heating;
      the undercarriage support structure configured to deform from the photothermal heating caused by an undesired signal thereby shifting the transparent metasurface stop band in frequency toward the undesired signal to be filtered.

11. The system of claim 10, wherein the transparent metasurface is a Distributed Bragg Reflector (DBR).

12. The tunable optical filter of claim 10, wherein the transparent metasurface comprises a multilayer actuator stack exhibiting Fabry-Perot resonance.

13. The system of claim 10, wherein the transparent metasurface is a High Contrast Grating (HCG).

14. The system of claim 10 further comprising:
    the undercarriage support additionally configured to deform from electrically controlled joule heating.

15. The system of claim 10, wherein the undercarriage support comprises:
    a plurality of actuators;
    a first portion of the plurality of actuators coated with a tailored absorptive film in a spectral region of interest; and
    a second portion of the plurality of actuators coated with a thin reflective material.

16. The system of claim 15, wherein the first portion of the plurality of actuators is positioned opposite the second portion of the plurality of actuators.

17. The system of claim 15, wherein the plurality of actuators comprise bimorph films.

18. The system of claim 10, wherein the undercarriage support comprises a plurality of actuators configured in a serpentine pattern.

19. A method of optical filtering, comprising:
    exposing a detector with an optical filter to an undesired signal, the optical filter including a transparent metasurface having a transmissive pass band and a stop band, which is proximate a plate having material properties making it transparent to a range of optical frequencies in the transmissive pass band, which is proximate a undercarriage support;
    deforming the undercarriage support from the photothermal heating caused by the undesired spectral signal;
    shifting the transparent metasurface stop band in frequency toward the undesired signal in response to the deformation of the undercarriage support; and
    blocking reception of the undesired signal by the detector.

20. The method of claim 19, further comprising:
    deforming the undercarriage support from electrically controlled joule heating.

21. The method of claim 19, further comprising:
    coating a first plurality of actuators of the undercarriage support with an absorptive film in a spectral region of interest;
    coating a second plurality of actuators of the undercarriage support with a thin reflective material; and
    asymmetrically deforming the undercarriage support from responses of the first and second plurality of actuators to the photothermal heating.

* * * * *